(12) United States Patent
Oriakhi et al.

(10) Patent No.: US 7,897,203 B2
(45) Date of Patent: Mar. 1, 2011

(54) INTERCALATED COMPOUND

(75) Inventors: Christopher O. Oriakhi, Corvallis, OR (US); Sukanya Rengaswamy, Corvallis, OR (US); Isaac Farr, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 729 days.

(21) Appl. No.: 11/789,096

(22) Filed: Apr. 23, 2007

(65) Prior Publication Data

US 2008/0259147 A1   Oct. 23, 2008

(51) Int. Cl.
*B05D 5/06* (2006.01)
*C09D 11/00* (2006.01)
*C09D 11/02* (2006.01)
*B41J 2/01* (2006.01)

(52) U.S. Cl. ........ 427/164; 427/58; 427/108; 427/126.1; 427/126.3; 427/162; 106/31.6; 106/31.9; 106/31.92; 347/95; 347/100

(58) Field of Classification Search .................. 427/162, 427/164, 108, 126.1, 126.3; 106/31.6, 31.9, 106/31.92, 31.86, 31.78, 31.88; 347/100
See application file for complete search history.

(56) References Cited

U.S. PATENT DOCUMENTS

| | | | |
|---|---|---|---|
| 4,576,649 | A | 3/1986 | Oliver |
| 4,705,567 | A | 11/1987 | Hair |
| 5,644,350 | A * | 7/1997 | Ando et al. .................. 347/101 |
| 5,908,495 | A | 6/1999 | Nohr et al. |
| 6,077,339 | A | 6/2000 | Nyssen |
| 6,235,095 | B1 | 5/2001 | Nohr et al. |
| 6,387,498 | B1 | 5/2002 | Coulter |
| 6,582,506 | B2 | 6/2003 | Archambeault |
| 6,686,042 | B1 | 2/2004 | LeGallee |
| 6,749,936 | B2 | 6/2004 | Argoitia |
| 6,767,633 | B2 | 7/2004 | Steudel |
| 7,641,728 | B2 | 1/2010 | Oriakhi et al. |
| 2002/0149656 | A1 | 10/2002 | Nohr et al. |
| 2006/0189113 | A1 | 8/2006 | Vanheusden |
| 2006/0201383 | A1 | 9/2006 | Moffatt et al. |

OTHER PUBLICATIONS

Pomogailo, A.D., Synthesis and Intercalation Chemistry of Hybrid Organo-Inorganic Nanocomposites, Polymer Science, Ser. C, 2006, vol. 48, No. 1, pp. 85-111, Pleiads Publishing, Inc., 2006.

* cited by examiner

*Primary Examiner* — Michael Cleveland
*Assistant Examiner* — Lisha Jiang

(57) ABSTRACT

Embodiments of a metal oxide intercalated ink-jettable compound are disclosed.

18 Claims, 1 Drawing Sheet

INTERCALATED COMPOUND

BACKGROUND

Polyoxometalates may be utilized in electronic or display applications such as use in ionic conductors, electrochromic materials, and photochromic materials. It may be desirable to selectively deposit such materials to reduce manufacturing costs and improve product quality.

DETAILED DESCRIPTION OF THE DRAWINGS

Figure 1:
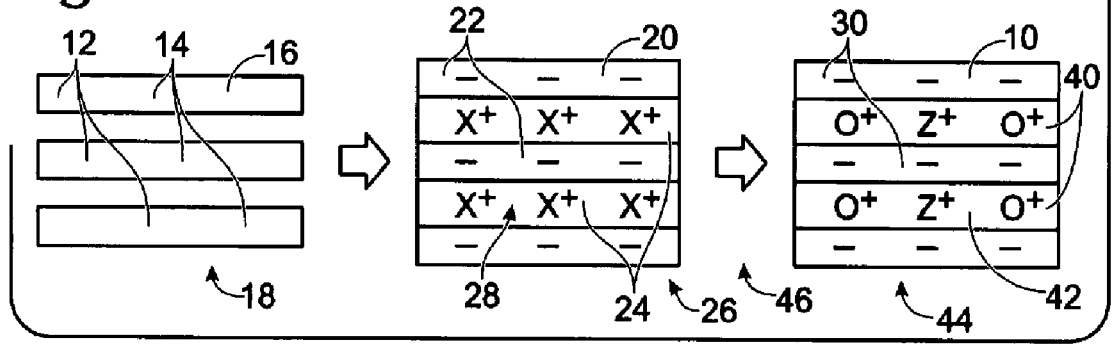
FIG. 1 is a schematic view of one example embodiment of a process of manufacturing one example embodiment of an intercalated compound.

FIG. 1 shows one example embodiment of a process of manufacturing one example embodiment of an intercalated compound 10. An intercalated compound may be defined as a compound having particles, ions, molecules, sub-compounds, elements, or the like, trapped or dispersed therein. Moreover, an intercalated metal oxide may be defined by layering at a molecular level whereas a metal oxide may be defined by a bulk particle in solution. Intercalated compound 10 is manufactured by first providing inorganic metal oxide compounds 12 which may be in the form of sheets 14 or layers positioned adjacent one another in a layered system 16 or stacked arrangement. The sheets 14 may be completely delaminated and may lack stacking coherence unless in the presence of guest ions or polymers. For ease of illustration, sheets 14 in the left hand portion of FIG. 1 are shown in a laminated arrangement, Metal oxide compounds 12 may be molybdenum oxide ($MoO_3$), tungsten oxide ($WO_3$), vanadium oxide ($V_2O_5$), or any other applicable metal oxide. In one example embodiment, three layers of molybdenum oxide are positioned adjacent one another in a three layered system 16. However, in other embodiments, other numbers of layers may be positioned adjacent one another. Layered system 16 may be in a solution 18, such as water. A preferred form of the oxide or the starting material is the modified oxide (i.e. metal ion intercalated oxide). Sodium ions may then be added to the solution 18 to form a sodium intercalated molybdenum intercalated layered system 20, as shown by Equation 1 below.

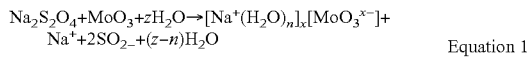

Equation 1

As shown in FIG. 1, sodium intercalated molybdenum oxide system 20, may include sheets of metal oxide 22, which may be referred to as host layers 22, and may have a negative charge, as indicated by the minus signs in FIG. 1. The $MoO_3$ sheets in the $Na_xMoO_3$ systems are negatively charged. The Na+ in the interlayer balances the charge on the $MoO_3$ sheets. Layers 24 of a cation, indicated by an "X" in FIG. 1, which in the example embodiment is sodium, may be intercalated between the host layers 22, and may have a positive charge as indicated by the plus sign next to "X". This intercalated layered system 20 may be in a solution 26 of water, low molecular weight alcohols (ethanol, propanol, or 1,5-pentanediol) or polar aprotic solvents (2-pyrrolidone, methyl formamide, or dimethyl sulfoxide), or a combination thereof. Layered system 20 may also be referred to as stacks of negatively charged metal oxide sheets 22 with a layer 24 of a cation "X" positioned within the interlayer galleries 28. Cation "X" may be H, Li, Na, K, Rb, Cs, Tl, Au, Ag, $NH_4^+$, or other organic cations.

The stacked layer arrangement of intercalated system 20, shown in the middle section of FIG. 1, is shown arranged in a neat stack for ease of illustration. In a preferred embodiment, sheets 22 and cations 24 may be free floating in solution, i.e., delaminated, and may not be orderly arranged in the stacked arrangement shown in the middle section of FIG. 1.

In the next step of manufacturing one example embodiment of an intercalated compound 10, an ion exchange of the first cation "X" with a second cation "Z" may be performed, as shown in Equation 2 below.

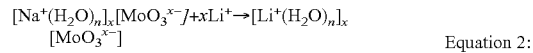

Equation 2:

This step may result in layers 30 of negatively charged metal oxide sheets with a layer 40 of the second cation "Z" positioned in the interlayer galleries 42 of intercalated compound 10. Layer 40 may also referred to as a guest layer 40.

The product of Equation 2 may be collected and dried in air to yield a intercalated compound 10 having a deep blue color. If potassium is used as the second cation "Z", the resulting intercalated compound 10 may have a light blue color. In example embodiments, the following colors may be produced: $KxMoO_3$, where x can be between 0 and 1 and produces a color in a range of blue bronze to red bronze, depending on the level of potassium intercalation, $H_xMoO_3$ having a blue bronze color, $HxMoO_3$ having a red bronze color, $MoO_3$ $(4,4'-bpy)_{0.5}$ having a yellow color, and $H_{0.3}MoO_3(4,4'-bpy)_{0.5}$ having a black color. In another embodiment, compound 10 may be a $MoO_3$-citric acid stacked layer compound having multicolor photochromic properties.

In the next step of manufacturing one example embodiment of an intercalated compound 10, formation of a colloidal dispersion, i.e., exfoliation and suspension, may be performed, as shown in Equation 3 below.

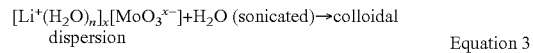

Equation 3

The sonification of the reaction of Equation 3, in one example embodiment, may take place for approximately twenty minutes. In Equation 3, other polar solvents may be used in place of water.

As shown in FIG. 1, Equation 3 may be represented by the second reaction arrow in FIG. 1. After the reaction of Equation 3, and prior to the final formation of intercalated compound 10 as shown in FIG. 1, an organic polymer or an organic dye may be added to the solution 44 including colloidal dispersion 46 such that the organic material "O" may also be intercalated into interlayer galleries 42, along with second cation "Z". In the embodiment shown, the first cation "X" is sodium and the second cation "Z" is lithium. However, other cations or mixtures thereof may be used for either of the first or second cations, such as hydrogen (H), lithium (Li), sodium (Na), potassium (K), rubidium (Rb), cesium (Cs), thallium (Tl), tin (Sn), chromium (Cr), manganese (Mn), copper (Cu), silver (Ag), gold (Au), or the like. The organic polymer or organic dye utilized may be one or more of polyvinyl alcohol (PVA), polyethylene glycol (PEG), polyethylene oxide (PEO), polyethylene imine (PEI), polyaniline (PANI), polypyrrole (PPY), polythiophene (PTh), polyvinyl acetate (PVOH), substituted analogs or copolymers, amines, pyridines, anilines, alkyl ammoniums, bipyridines, triazoles and a dye.

The amount of the second cation "Z" and the amount of the organic material "O" contained within interlayer 40 may depend on the amount of the individual reactants used. In some embodiments, second cation "Z" may not completely replace first cation "X" so that the first cation "X", the second cation "Z", and one or more of an organic material "O" may all be present in interlayer 40 of intercalated compound 10.

The amount of each material in intercalated compound 10 may be chosen as desired to produce an intercalated compound 10 having desired properties, as will be described below. In one example embodiment, the components of colloidal dispersion 46 may include DEG (2 wt %), 2-P (7%), IPA (4%), Surfynol 465 (0.1%), water (81.9%), and $Li_xMoO_3$ (2%).

In another example embodiment of the ink formulation process of intercalated compound 10, the following process was followed. Step one, 0.45 grams of PEG 600 was dissolved in 7 ml of water. This was stirred with a magnetic stirrer to ensure full dissolution. Step two, 0.6 g $K_xMoO_3$ was suspended in 7 ml of water. This was stirred magnetically to ensure full dispersion. Step three, the solution of step 2 was slowly added to the solution of step 1 while stirring. Step four, 1.5 g of DEG, 1.8 g pf 2-P, 0.9 g of IPA, and 0.06 g Surfynol 465 were blended in a beaker of 16 ml of water and mixed thoroughly. Step five, the solution of step four was added to the dispersion of step 3. Step six, the solution of step five was sonicated for five minutes using a power setting of not more than 5 to reduce overheating. Step seven, 12 ml of the solution of step six, which contained intercalated compound 10, was then placed in an inkjet print cartridge and printing was conducted.

The physical characteristics of the ink-jettable intercalated compounds 10 made by the above process are shown in Table 1 below:

| Compound | pH | cond | St | Viscosity | Particle Size (nanotrac) Mean Value (nm) |
|---|---|---|---|---|---|
| $Li_xMoO_3$ | 2.53 | 1.94 | 33.6 | 1.92 | 124.6 |
| $Na_xMoO_3$ | 4.13 | 510 | 37.1 | 1.11 | 90.8 |
| $K_xMoO_3$ | 2.82 | 1727 | 36.3 | 1.17 | 312.4 |

Figure 2:
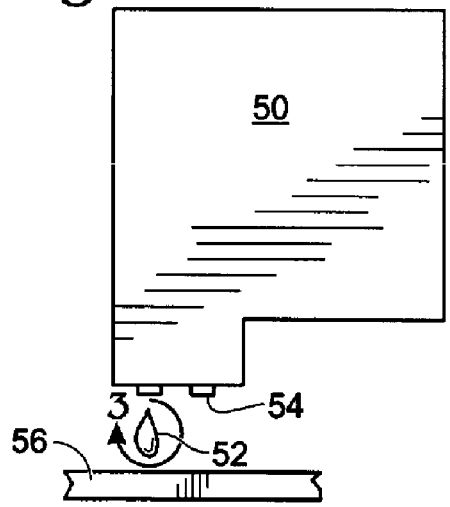
FIG. 2 is a side view of a inkjet printer depositing one example embodiment of a droplet of material including one embodiment of the intercalated compound.
Figure 3:
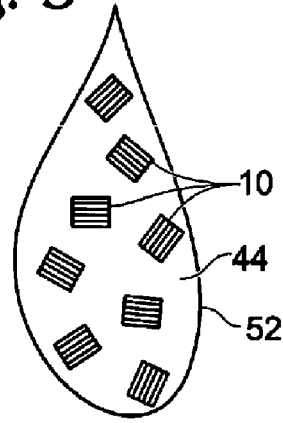
FIG. 3 is a side view of a drop of an intercalated compound in solution.

FIGS. 2 and 3 are a side view of a inkjet printhead 50 depositing one example embodiment of a droplet 52 of material including intercalated compound 10, and a side view of a droplet 52 including intercalated compound 10. Intercalated compound 10, in solution 44, may have a compound size of less than 200 nm, and approximately 150 nm, which is smaller than a size, such as less than 1 μm, of the individual ones of nozzles 54 of an inkjet printhead 50. The nozzle size may depend on the printer platform used, and may be much larger than 1 micron.

Due to the small size of intercalated compound 10, and its ability to be ejected through the small orifices of nozzles 54 of inkjet printhead 50, intercalated compound 10 may be selectively deposited on a substrate 56 in a precise, predetermined pattern. Accordingly, intercalated compound 10 may be deposited to form a pattern, such a discrete micro fabricated, microelectronic component 58 (see FIG. 4) on substrate 56, without the use of multiple masking, deposition and etching steps. Accordingly, ink-jettable intercalated compound 10 may allow the production of microelectronic components 58 in a cost effective manner, with high quality and large throughput.

Intercalated compound 10 may have very good stability for at least two reasons: the organic polymer materials may inhibit agglomeration, and the negative charge of sheets 22 may attract the positive intercalated compound within the interlayer galleries and cause the destabilization of the dispersion. In a preferred embodiment, this attraction of the negative charge on sheets 22 and the positive intercalated compound will occur during printing on a suitable substrate, not when the ink is in the cartridge. For example, in one experimental embodiment, an inkjet pen was filled with an intercalated compound 10 of $MoO_3$-bronze and printed. The ink pen was then stored at room temperature for four months, after which the pen was seen to continue to produce high quality printed product.

Still referring to FIGS. 2 and 3, ink-jettable intercalated compound 10 may also include visible metallic luster properties. In particular, intercalated compound 10 may provide a stable ink suspension, which may include a color dye, that may be deposited by an ink jet structure to provide a printed ink having a metallic luster, also referred to as a metallic shine. Due to the small size of intercalated compound 10, and due to the stability of the intercalated compound 10, the metallic luster ink may be deposited by ink jet methods, such that the metallic luster ink may be deposited in digital imaging applications and/or micro electronic applications. The printed ink of intercalated compound 10 has a metallic luster characteristic of a true metal nanoparticle, i.e., metal oxide layering with metallic cation guests at the nano-level, as opposed to a large metallized plastic particles that may not be amenable to ink jet deposition methods. The metallic cation guests that have been shown or believed to give intercalated compound 10 its metallic luster include, but are not limited to, Au, Ag, Li, Na, H+ and K.

Figure 4:
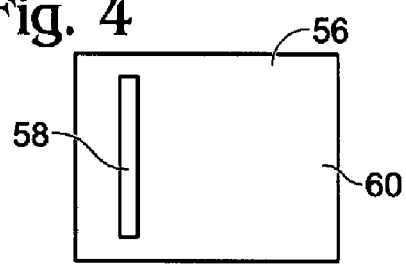
FIG. 4 is a top view of an electronic device including a micro fabricated device including a deposited line of one example embodiment of the intercalated compound.

FIG. 4 is a top view of an electronic device 60 formed on a substrate 56. Electronic device 60 may include micro fabricated component 58 including a deposited amount of one example embodiment of the intercalated compound 10. Device 60 may have application in molecular electronics, energy storage, optics, displays, catalysis, photochromic devices, and electrochromic devices. $MoO_3$ and the $WO_3$ composite materials may be semiconductors, such that intercalated compound 10 may be tailored with the addition of conductive and/or non-conductive organic materials. In some example embodiments, micro fabricated component 58 may be an electrically conductive trace, an ionically conductive trace, a solid state electrolyte having ionic transport properties, or a switchable light window, either photo or electro based. The organic portion of intercalated compound 10 may be a conductor (such as polyaniline) or an insulator. In some applications, the organic material may be thermally removed if desired.

In several example embodiments, the electrical conductivity, as a function of thermal exposure, was measured. A two point test configuration was used to measure the conductance. For an intercalated compound 10 of $Na_xMoO_3$, with a probe spacing of 1 millimeters (mm), 2 mm, 3 mm, and 4 mm, respectively, the conductance was measured as 158 ohms, 186 ohms, 206 ohms, and 218 ohms, respectively. For an intercalated compound 10 of $Li_xMoO_3$, with a probe spacing of 1 mm, 2 mm, 3 mm, and 4 mm, respectively, the conductance was measured as 526 ohms, 670 ohms, 832 ohms, and 923 ohms, respectively. For an intercalated compound 10 of K×MoO$_3$, with a probe spacing of 4 mm, the conductance was measured as 10,100 ohms. The conductivities presented here are for a particular example embodiment and are not optimized.

Figure 5:
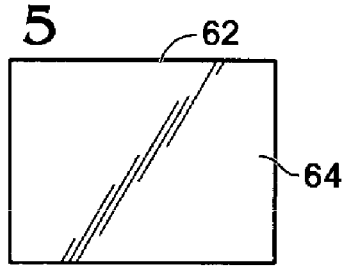
FIG. 5 is a top view of substrate including a coating of an intercalated compound in an inactivated state.

FIG. 5 is a top view of a 62 substrate including a coating 64 of an intercalated compound 10 in an inactivated state. In this inactivated state, intercalated compound 10 may be clear or colorless.

Figure 6:
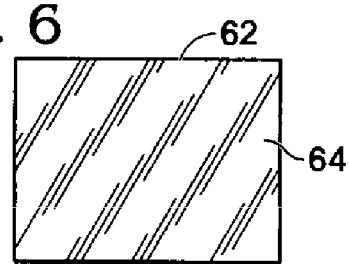
FIG. 6 is a top view of substrate including a coating of an intercalated compound in an activated state.

FIG. 6 is a top view of substrate 62 including a coating 64 of an intercalated compound 10 in an activated state. In this activated state, intercalated compound 10 may be colored. Accordingly, intercalated compound 10 may be used in "smart windows" applications, such as electrochromics and/or photochromics. Coating 64 may be activated by application of an applied current by the use of leads (not shown) or by application of light, such as sunlight, for example. In one example embodiment, movement from the inactivated state to the activated state, by electrochromic application of an applied current, may be shown by the following Equation 4 below:

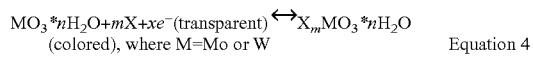

$$MO_3 \cdot nH_2O + mX + xe^- \text{(transparent)} \leftrightarrow X_mMO_3 \cdot nH_2O$$
(colored), where M=Mo or W        Equation 4

In another example embodiment, movement from the inactivated state to the activated state, by photochromic light application, may be shown by the following Equation 5 below:

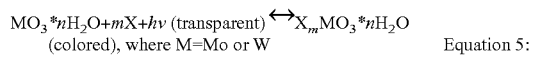

$$MO_3 \cdot nH_2O + mX + h\nu \text{ (transparent)} \leftrightarrow X_mMO_3 \cdot nH_2O$$
(colored), where M=Mo or W        Equation 5:

In another example use of intercalated compound 10, the compound may be a MoO$_3$-PANI stacked layer compound having sensor properties adapted to sense toxic gases and volatile organic compounds. PANI is an electronically conducting polymer which has a simple doping/undoping chemistry based on acid/base reactions. The basic form is relatively non-conducting whereas the acidic form is conductive. The sensing principle is based on the fact that when the blue non-conducting emeraldine base PANI comes into contact with acidic gas such as HCl or H$_2$S, it rapidly becomes doped to form the green conducting emeraldine salt (acidic form). This change results in a dramatic decrease in the resistance—a principle used in gas sensors.

According, there is disclosed, an ink-jettable intercalated compound 10 that may be deposited using inkjet techniques. Such selective application of intercalated compound 10 may reduce material waste, reduce tooling and operational costs, and may allow a significant improvement in design flexibility. The example intercalated compounds 10 disclosed are environmentally stable, even in the conducting state, and may be fabricated using various methodologies, unlike traditional 1-D and 3-D materials. Moreover, device fabrication by the use of inkjet deposition is amenable to large-scale manufacturing processes.

Other variations and modifications of the concepts described herein may be utilized and fall within the scope of the claims below.

We claim:

1. A method of depositing an intercalated metal oxide, comprising:
    placing a printable amount of a solution in an inkjet printer having a plurality of inkjet nozzles therein, said solution including a multiplicity of intercalated metal oxide stacked layer structures having a size adapted for passing through said nozzles, and each said structure comprising alternating layers of a first material comprising at least one inorganic metal oxide and at least one intercalated second material selected from the group consisting of an organic polymer and an organic dye; and
    printing said solution through individual ones of said plurality of inkjet nozzles of said inkjet printer onto a substrate.

2. The method of claim 1 wherein said solution is printed through said individual ones of said plurality of inkjet nozzles to form a coating on said substrate, wherein said coating comprises an electrochromic device or a photochromic device.

3. The method of claim 1 wherein said solution is printed through said individual ones of said plurality of inkjet nozzles to form a micro fabricated electronic device on said substrate.

4. The method of claim 1 wherein said solution includes a metallic luster property.

5. The method of claim 1, wherein said metal oxide is selected from the group consisting of one of molybdenum oxide, vanadium oxide, and tungsten oxide, and combinations thereof.

6. The method of claim 1, wherein said second material is selected from the group consisting of polyvinyl alcohol, polyethylene glycol, polyethylene oxide, polyethylene imine, polyaniline, polypyrrole, polythiophene, polyvinyl acetate, and substituted analogs or copolymers thereof, amines, pyridines, anilines, alkyl ammoniums, bipyridines, triazoles and a dye.

7. The method of claim 1, wherein each said stacked layer structure includes at least two layers of said first material and at least one layer of said second material.

8. The method of claim 1, wherein each said stacked layer structure has a size of at most 200 nm.

9. The method of claim 1, wherein said intercalated metal oxide is electrically conductive.

10. The method of claim 1, wherein at least a portion of said second material comprises a cation.

11. The method of claim 1, wherein said solution has a red bronze color and comprises an intercalated metal oxide selected from the group consisting of K$_{0.33}$MoO$_3$ and H×MoO$_3$.

12. The method of claim 1, wherein said solution has a blue bronze color and said intercalated metal oxide comprises K$_{0.3}$MoO$_3$.

13. The method of claim 1, wherein said solution has a yellow color and said intercalated metal oxide comprises MoO$_3$(4,4'-bpy)$_{0.5}$.

14. The method of claim 1, wherein said solution has a black color and said intercalated metal oxide comprises H$_{0.5}$MoO$_3$(4,4'-bpy)$_{0.5}$.

15. The method of claim 1, wherein said intercalated metal oxide comprises MoO$_3$-polyaniline and the resulting printed substrate has sensor properties adapted to sense acidic and basic gases and volatile organic compounds.

16. The method of claim 1, wherein said intercalated metal oxide comprises MoO$_3$-citric acid and the resulting printed substrate has multicolor photochromic properties.

17. The method of claim 1, wherein each said intercalated metal oxide stacked layer structure is a solid electrolyte and includes ionic transport properties.

18. The method of claim 1, wherein the resulting printed substrate has visible metallic luster.

* * * * *

UNITED STATES PATENT AND TRADEMARK OFFICE
CERTIFICATE OF CORRECTION

| | |
|---|---|
| PATENT NO. | : 7,897,203 B2 |
| APPLICATION NO. | : 11/789096 |
| DATED | : March 1, 2011 |
| INVENTOR(S) | : Christopher O. Oriakhi et al. |

It is certified that error appears in the above-identified patent and that said Letters Patent is hereby corrected as shown below:

In column 6, line 41, in Claim 11, delete "H×MoO$_3$" and insert -- H$_x$MoO$_3$ --, therefor.

Signed and Sealed this
Twenty-fifth Day of October, 2011

David J. Kappos
*Director of the United States Patent and Trademark Office*